(12) United States Patent
Prabhakar et al.

(10) Patent No.: US 12,455,779 B2
(45) Date of Patent: Oct. 28, 2025

(54) PROCESSING NATURAL LANGUAGE NETWORK QUERIES

(71) Applicant: Arista Networks, Inc., Santa Clara, CA (US)

(72) Inventors: Krishna Prabhakar, Los Altos Hills, CA (US); Rajarao Bhagya Prasad Nittur, Milpitas, CA (US); Anoop Kumaran Nair, Thrikkakara (IN); Rajesh Kumar Ganapathy Achari, Perumbavoor (IN); Madhusudhan Chitradurga Sethuram Setty, Bengaluru (IN); Venkatesh Ramachandran, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/486,051

(22) Filed: Oct. 12, 2023

(65) Prior Publication Data

US 2024/0411752 A1    Dec. 12, 2024

(30) Foreign Application Priority Data

Jun. 12, 2023  (IN) .............................. 202341039926

(51) Int. Cl.
  *G06F 11/07* (2006.01)
  *G06F 11/22* (2006.01)
  (Continued)

(52) U.S. Cl.
  CPC ........ *G06F 11/0709* (2013.01); *G06F 11/079* (2013.01); *G06F 11/0793* (2013.01); *G06F 11/2257* (2013.01); *G06F 16/242* (2019.01); *G06F 16/245* (2019.01); *G06F 40/295* (2020.01); *G06F 40/40* (2020.01); *G06N 5/022* (2013.01); *H04L 9/0825* (2013.01); *H04L 41/0806* (2013.01); *H04L 41/0893* (2013.01);
  (Continued)

(58) Field of Classification Search
  CPC ...... G06F 16/245; G06F 16/242; G06F 40/40; G06F 40/295
  See application file for complete search history.

(56) References Cited

U.S. PATENT DOCUMENTS 7,720,674 B2    5/2010  Kaiser et al.
7,730,008 B2    6/2010  Foulger et al.
(Continued)

*Primary Examiner* — Courtney Harmon
(74) *Attorney, Agent, or Firm* — Treyz Law Group; Jason Tsai

(57) ABSTRACT

A method of operating a network is provided that includes receiving a query, using a first language model to determine an intent or purpose of the query, using a second language model to extract a named entity from the query, and obtaining search results by searching for the extracted named entity on a named entity list corresponding to a particular tenant. The method can further include generating a response based on the search results. The query can be a natural language query, and the first language model can be a natural language model. The second language model for extracting the named entity can be a network-related language model that is trained on network records associated with a plurality of tenants. The network records associated with the plurality of tenants can be stored on a multi-tenant database.

16 Claims, 9 Drawing Sheets

---

Query: Why devices are not able to connect
Response: There are more than 10 failed sessions. Following are the possible reasons for failure

- 80% - PSK used to connect to the network does not match the configured one.

Recommendation: Please ensure that the client has the correct PSK. Check to see if this is illegal access.

- 20% - Access denied by configured policy.

Recommendation: Either client has violated required policies or policy configuration might need changes. Please check policy configuration and client device-type, group etc.

<Failed authentication records>
        1462

(51) Int. Cl.

| | |
|---|---|
| *G06F 16/242* | (2019.01) |
| *G06F 16/245* | (2019.01) |
| *G06F 40/295* | (2020.01) |
| *G06F 40/40* | (2020.01) |
| *G06N 5/022* | (2023.01) |
| *H04L 9/08* | (2006.01) |
| *H04L 9/40* | (2022.01) |
| *H04L 41/0806* | (2022.01) |
| *H04L 41/0893* | (2022.01) |
| *H04L 41/0894* | (2022.01) |
| *H04L 41/0895* | (2022.01) |
| *H04L 41/14* | (2022.01) |
| *H04L 41/149* | (2022.01) |
| *H04L 41/28* | (2022.01) |
| *H04L 43/0876* | (2022.01) |

(52) U.S. Cl.
CPC ...... *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/083* (2013.01); *H04L 63/0876* (2013.01); *H04L 63/10* (2013.01); *H04L 63/102* (2013.01)

(56) References Cited

U.S. PATENT DOCUMENTS

| | | | |
|---|---|---|---|
| 8,645,405 | B2 | 2/2014 | Chang et al. |
| 10,713,441 | B2 | 7/2020 | Sapugay et al. |
| 10,885,026 | B2 | 1/2021 | Das et al. |
| 11,520,992 | B2 | 12/2022 | Sapugay et al. |
| 11,620,473 | B1* | 4/2023 | Zhang .................. G06F 18/213 382/159 |
| 2015/0127829 | A1* | 5/2015 | Biswas .................. H04L 63/20 709/225 |
| 2020/0007397 | A1* | 1/2020 | Fainberg ............. H04L 41/0895 |
| 2020/0183989 | A1* | 6/2020 | Krogh .................... G06F 40/56 |
| 2020/0349940 | A1* | 11/2020 | Ko ........................ G10L 15/063 |
| 2022/0239569 | A1* | 7/2022 | Wu ...................... H04L 41/0677 |
| 2022/0303301 | A1* | 9/2022 | Hubbard ............. H04L 63/1441 |
| 2022/0343066 | A1* | 10/2022 | Kwong ................. H04M 1/271 |
| 2023/0208841 | A1* | 6/2023 | Cruz Benito ........ G06F 40/295 726/1 |
| 2023/0315722 | A1* | 10/2023 | Saxe .................... G06F 16/3322 726/1 |
| 2024/0176962 | A1* | 5/2024 | Jain ........................ G06F 40/58 |

* cited by examiner

Query: Get info about Edwards
Response: User Edwards(edwards@domain.com) has 2 devices(iPhone(00:01:02:03:04:05), Windows(00:23:34:46:57:78)). Edwards' iPhone is currently connected to the network. Edwards seems to be offline for the last few days.

FIG. 6

Query: Tell me about user bob
Response: I found the user Bob(bob@arista.com) in the organization. Bob has 2 onboarded devices. Bob was last active on the network 2 day's back. No devices of Bob are currently connected to the network.

<Bob's last N network access records> } 1450

FIG. 7

Query: Why devices are not able to connect
Response: There are more than 10 failed sessions. Following are the possible reasons for failure

- 80% - PSK used to connect to the network does not match the configured one.

Recommendation: Please ensure that the client has the correct PSK. Check to see if this is illegal access.

- 20% - Access denied by configured policy.

Recommendation: Either client has violated required policies or policy configuration might need changes. Please check policy configuration and client device-type, group etc.

<Failed authentication records>
⎵
1462

FIG. 8

Query: Why edward is not able to authenticate?
Response: There are more than one Edwards in your organization. Do you mean:
    edwardA@domain.com
    edwardB@domain.com
    edwardC@domain.com

FIG. 10

Query: Will bob come to office today?
Response: I'm sorry, I could not find the required information matching the given query.

FIG. 11

Query: I want to set up wireless network
Response: What SSID do you want to use?
User input: Skynet007

FIG. 12

PROCESSING NATURAL LANGUAGE NETWORK QUERIES

This application claims the benefit of Indian Provisional Patent Application No. 202341039926, filed Jun. 12, 2023, which is hereby incorporated by reference herein in its entirety.

BACKGROUND

A network can include many different types of devices such as cameras, thermostats, smoke detectors, medical or health sensors, lighting fixtures, voice-controlled speakers, printers or other output devices, controllers or other input devices, cars, wearable devices, and/or other network-connected equipment. These devices can be associated with one or more users, can have different network addresses, can be at one or more locations, and/or can have different network-related attributes. It can be challenging to manage or troubleshoot a network with many devices all having different network-related attributes.

It is within this context that the embodiments herein arise.

BRIEF DESCRIPTION OF THE DRAWINGS

FIG. 6 is a diagram of an illustrative query about a user and a corresponding response that can be generated by the network access control and management server in accordance with some embodiments.

FIG. 7 is a diagram of an illustrative query about a user and a corresponding response with a link to additional network records that can be generated by the network access control and management server in accordance with some embodiments.

FIG. 8 is a diagram of an illustrative query for troubleshooting a network and a corresponding response that can be generated by the network access control and management server in accordance with some embodiments.

FIG. 10 is a diagram of an illustrative query that results in an ambiguous response that can be generated by the network access control and management server in accordance with some embodiments.

FIG. 11 is a diagram of an illustrative query that results in a default response that can be generated by the network access control and management server in accordance with some embodiments.

FIG. 12 is a diagram of an illustrative query for setting up a network and a corresponding response requesting additional information that can be generated by the network access control and management server in accordance with some embodiments.

DETAILED DESCRIPTION

Figure 1:
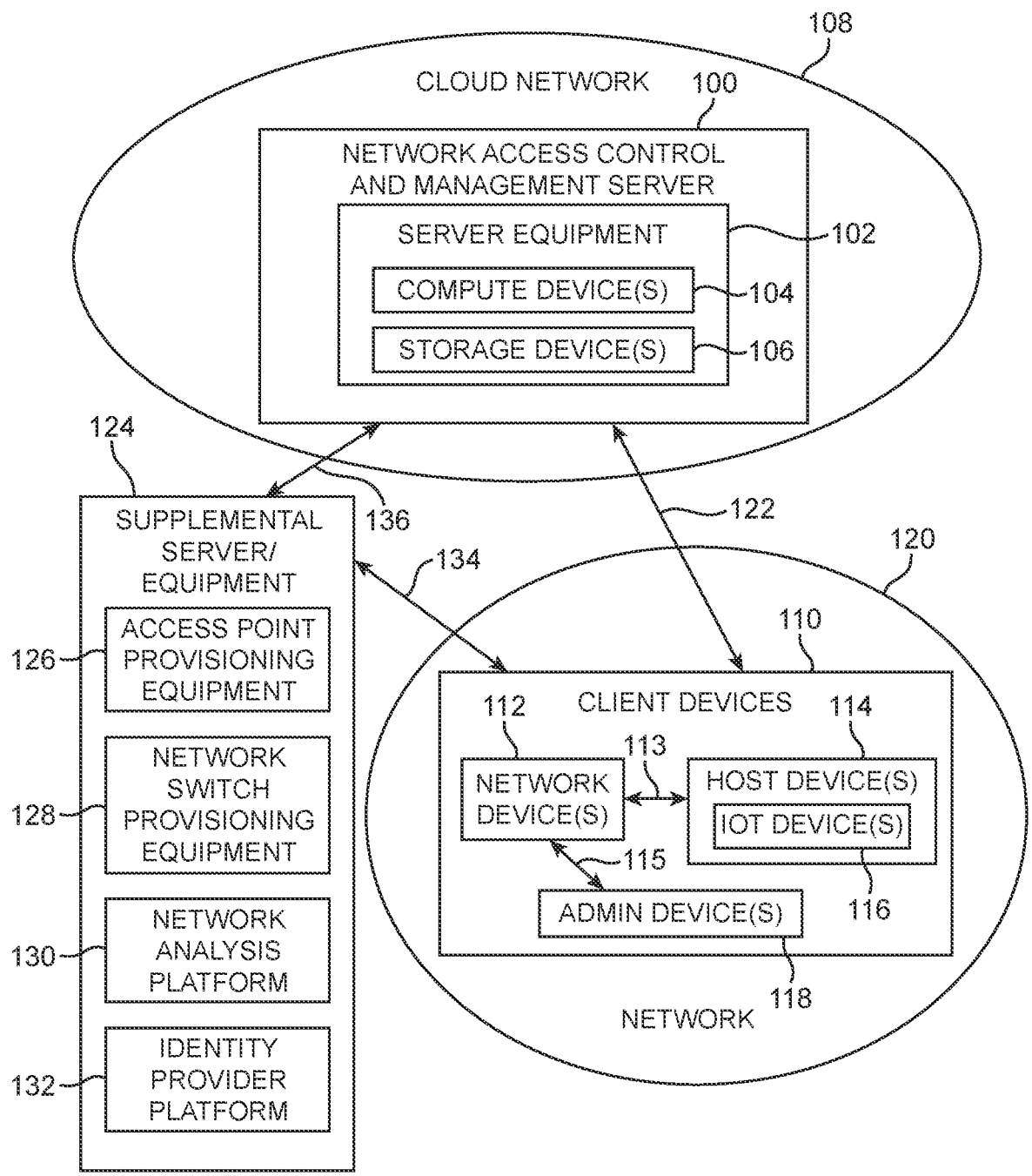
FIG. 1 is a diagram of an illustrative system having a network access control and management server in accordance with some embodiments.

FIG. 1 shows an illustrative networking system that includes a server such as network access control and management server 100. Network access control and management server 100 may be formed from server equipment 102 containing any suitable number of compute devices 104 and any suitable number of storage devices 106.

As an example, server equipment 102 may include server hardware such as blade servers, rack servers, tower servers, micro servers, graphics processing unit (GPU) servers, data storage servers, and enterprise servers. Configurations in which server equipment 102 includes rack servers mounted to racks of a server chassis or enclosure are sometimes described herein as an illustrative example. Each of compute devices 104 and/or storage devices 106 may be provided as part of the server hardware (e.g., as part of rack servers).

Compute devices 104 may include one or more processors or processing units based on central processing units (CPUs), graphics processing units (GPUs), microprocessors, general-purpose processors, host processors, microcontrollers, digital signal processors (DSPs), programmable logic devices such as a field programmable gate array (FPGA) devices, application specific system processors (ASSPs), application specific integrated circuits (ASICs), and/or other types of processors. Storage devices 106 may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry. More specifically, storage devices 106 may include non-transitory (tangible) computer readable storage media configured to store the operating system software and/or any other software code, sometimes referred to as program instructions, software, data, instructions, or code. Compute devices 104 may run (e.g., execute) an operating system and/or other software/firmware that is stored on storage devices 106 to perform desired operations of server 100. In such a manner, server equipment 102 may implement one or more services, one or more software servers, and/or other software features to collectively perform the functions of network access control and/or network management for server 100. As described herein, server 100 can refer to the underlying server (hardware) equipment and/or the server software (e.g., services) executed thereon to perform the operations of server 100.

Network access control and management server 100 may be configured to provide network policy reception, definition, monitoring, and enforcement (e.g., reception, definition, and enforcement of network access policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on natural language user input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., obtain network and/or user information from and distribute network and/or user information to external equipment), and device and/or user onboarding (e.g., registration and storage of user and/or user device information), as just a few examples. In general, server 100 may perform any suitable functions for network access control and management.

Server 100 may be implemented as a part of a cloud network such as cloud network 108. Cloud network 108 may include one or more network devices such as switches (e.g., multi-layer switches), routers, gateways, bridges, hubs, repeaters, firewalls, wireless access points, devices serving other networking functions, devices that includes a combination of these functions, or other types of network devices. Multiple such network devices (e.g., network devices of different types or having different functions) may be present in cloud network 108 and interconnected therebetween and with other network devices to form a cloud network that forwards traffic to and from portions (e.g., different parts of server equipment 102) of server 100 serving as end hosts of cloud network 108. Configurations in which server 100 is implemented on public cloud infrastructure (e.g., cloud network 108 is a public cloud network) are sometimes described herein as an illustrative example. If desired, server 100 may be implemented on a private cloud network or an on-premise network.

Network access control and management server 100 may communicate with client devices 110 such as one or more network device(s) 112, one or more host device(s) 114, and network administrator devices 118, which are used to configure and administer other network devices. Host devices 114 can include Internet-of-Things (IoT) devices 116 such as network-connected appliances or device such as network-connected cameras, thermostats, smoke detectors, medical or health sensors which are sometimes referred to as Internet-of-Medical-Things (IOMT) devices, or other sensors, lighting fixtures, voice-controlled speakers, printers, or other output devices, controllers or other input devices, cars, wearable devices, and other network-connected equipment that serve as input-output devices and/or computing devices in the distributed networking system. In some illustrative arrangements described herein as an illustrative example, communication between server 100 and at least some host devices 114 (e.g., IoT devices 116) may occur via network devices 112 and links 113 (e.g., network devices 112 may forward network traffic between server 100 and host devices 114 to facilitate communication therebetween). Client devices 110 may form part of network 120 for which server 100 provides the above-mentioned functions (e.g., network access control and management functions containing any combination of network policy handling, natural language query handling, network-connected device profiling, predictive failure event handling, network authentication, public key infrastructure (PKI) services, interfacing and integration services with external applications and/or servers, device and/or user onboarding, etc.).

Host devices 114 may serve as end hosts of network 120 connected to each other and/or connected to other end hosts of other networks (e.g., server 100 of cloud network 108) via network devices 112 using communication paths 113. User devices such as administrator devices 118 may perform network administration for network devices 112, while other user devices may serve as end host devices 114. Network devices 112 may include switches (e.g., multi-layer switches), routers, gateways, bridges, hubs, repeaters, firewalls, access points, modems, load balancers, devices serving other networking functions, devices that include a combination of these functions, or other types of network devices.

Network access control and management server 100 may provide network access control and network management services for network 120 by communicating with network devices 112 and/or host devices 114 via communication paths 122. To facilitate network access control and network management, server 100 may communicate with other supplement servers and/or equipment 124. These supplemental servers 124 may include network management and network device management equipment such as wireless access point provisioning (and/or management) equipment 126 (e.g., a wireless access point management server), network switch provisioning (and/or management) equipment 128 (e.g., a network switch management server), and/or other network device management equipment that communicate with network devices 112 (e.g., to supply provisioning and/or configuration data, to receive network performance metrics data, and/or to exchange other suitable information).

Supplemental servers and equipment 124 may include one or more network analysis platforms 130 such as servers and/or services that provide analysis of network performance by way of providing endpoint visibility and security analysis (e.g., based on network traffic to and/or from host devices 114). Supplemental servers and equipment 124 may further include platforms that provide additional contextual information for the network, the users on the network, and/or the devices on the network such as identity provider platform 132 (e.g., servers and/or services that provide user identity authentication, a single sign-on (SSO) provider platform). In particular, supplemental server and/or equipment 124 may communicate with components of network 120 (e.g., network devices 112 and host devices 114) to supply provisioning, configuration, and/or control data, to receive network, device, and/or user information, and/or to otherwise exchange information therebetween via communications paths 134. Supplemental server and/or equipment 124 may communicate with server 100 (e.g., different portions of server equipment 102) to transmit the received network, device, and/or user information, to receive network access control and/or management information, and/or to otherwise exchange information therebetween via communications paths 136.

Configurations in which equipment 126 and 128 and other network device management equipment refer to server equipment (e.g., similar to server equipment 102) on which network device provisioning and/or management software are executed are sometimes referred to herein as an illustrative example. Similarly, configurations in which network analysis platform 130 and identify provider platform 132 are cloud-based platforms (e.g., applications executed on server equipment) are sometimes described herein as an illustrative example. In these examples, servers and/or equipment 124 may be implemented within the same cloud network or different cloud networks than server 100. If desired, any of supplement servers and/or equipment 124 may be implemented locally (e.g., local to network 120) instead of as a cloud application (e.g., implemented on a cloud server) or may be implemented in other desired manners.

The networking system in FIG. 1 (e.g., the combination of cloud network 108, network 120, and equipment 124) may span any suitable scope depending on the implementations of servers 100 and 124. Communication paths 122, 134, and 136 may be implemented according to the scope of the networking system. Configurations in which one or more of communication paths 122, 134, and 136 include the Internet are sometimes described herein as an illustrative example. In particular, any of communications paths 122, 134, and 136 may use Hypertext Transfer Protocol Secure (HTTPS), Remote Authentication Dial-In User Service (RADIUS) with Transport Layer Security (TLS) encryption (e.g., RadSec), Secure Shell (SSH), Internet Protocol Security (IPSec), Secure File Transfer Protocol (SFTP), or other secure protocols for establishing and communicating using the corresponding communications paths.

Figure 2:
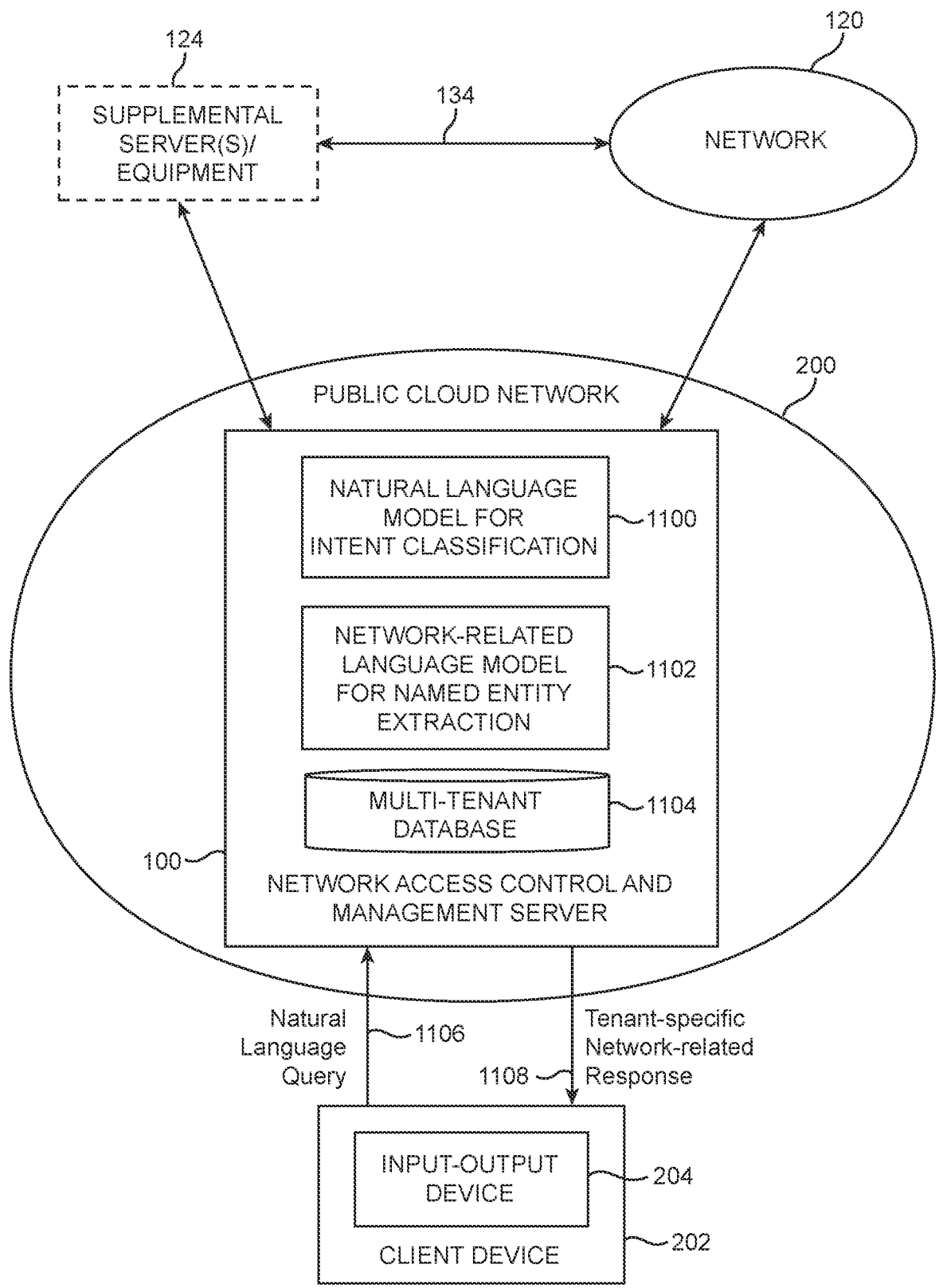
FIG. 2 is a diagram showing how the network access control and management server can be configured to receive a natural language query from a user device and to generate a corresponding tenant-specific network-related response in accordance with some embodiments.

FIG. 2 is a diagram showing how network access control and management server 100 can be configured to receive a natural language query from a user/admin device and to generate a corresponding tenant-specific network-related response in accordance with some embodiments. As shown in FIG. 2, server 100 may be implemented on public cloud network 200. This example in which network access control and management server 100 is implemented on a public cloud network is illustrative. If desired, network access control and management server 100 can alternatively or additionally be implemented on a private cloud network.

Network access control and management server 100 can include one or more language models. For example, server 100 can include a natural language model such as natural language model 1100 configured to facilitate with user intent classification and/or a network-related language model such as network-related language model 1102 configured to facilitate with named entity extraction. Natural language model 1100 is a model that is designed to process and generate human language in a way that is similar to how humans communicate, hence the name "natural language." Natural language model 1100 may be developed using machine learning techniques such as deep learning algorithms to analyze and generate text or speech. Natural language model 110 can be trained on massive amounts of textual data to learn patterns, semantics, grammar, and context of human language. Natural language model 1100 may be used to classify an intent or purpose of a natural language query provided by a user/admin to server 100. The meaning of "purpose" and "intent" in the context of a natural language query can be equivalent or interchangeable in the contexts described herein.

On the other hand, network-related language model 1102 is a model that is designed to identify or extract network-related terms from the natural language query provided by the user/admin. Network-related language model 1102 may be developed using machine learning techniques such as deep learning algorithms (as an example) to analyze and extract certain important (e.g., network-related) nouns from a string of text. Network-related language model 1102 can be trained on network data associated with one or more customers/clients to gain insight into network-related attributes such as various named entities associated with the one or more customers. Network-related language model 1102 can thus be used to extract one or more named entities from a natural language query provided by a user/admin to server 100. The term "named entity" can refer to and be defined herein as a network-related entity or element with a distinct and identifiable name. Named entities can be used to represent various components or aspects of a network and can include different types of client devices, host devices, network domains, users, applications, services, virtual machines, virtual networks, security related elements (firewall policies, access control lists, security groups, etc.), network segments, and/or other network-related named entities.

A network segment can refer to a portion of a computer network that is logically or physically separated from other parts of the network. Physical segmentation can be implemented using separate dedicated hardware for each network segment. Logical segmentation can be implemented using virtual local area networks (VLANs), which allow different devices to be grouped together virtually regardless of their physical location. Subnetting, which divides an IP address range into smaller sub-ranges and allows devices within the same subnet to communicate directly with each other without a router, can also be used to implement network segmentation. Network segmentation can be employed to improve network performance, security, isolation of critical assets, compliance, and manageability by organizing a large and often complex network into smaller, more manageable segments. Each network segment can operate independently to some extent with its own set of rules and policies governing access and communication. Thus, a network segment can be defined herein as a group of client devices that are or should be assigned the same or similar network access policy.

In some embodiments, network-related language model 1102 can be trained on network records. The network records may include user records (e.g., records of each user known to, having device(s) connected to, or otherwise associated with network 120) containing user identities, user authentication information, and/or other user attributes. The network records may include client records (e.g., records of client devices) containing device attributes (e.g., attributes described in connection with FIG. 8). The network records may include session records (e.g., records of sessions established by each client device known to, connected to, or otherwise associated with network 120) containing session start time, duration, and end time, session status, session diagnostic information, and/or any other parameter characterizing the session. Server 100 may populate the information for these records by directly communicating with devices of network 120, receiving user input information, and/or directly communicating with supplemental servers and/or equipment 124 that obtains the network information from devices of network 120 and supplies server 100 with processed versions or copies of the obtained network information. The maintenance of these records can help server 100 fine tune the network-related language model 1102.

A client device such as client device 202 (e.g., a host device 114, admin device 118, user device, or other types of client devices of network 120 in FIG. 1) may be configured to communicate with server 100 via a user interface. As examples, client device 202 may be a computing device such as a desktop, a portable computing device (e.g., a laptop, a cellular telephone, etc.), or other computing device configured to receive user input and convey the received user input to server 100. If desired, client device 202 may be an IoT device such as IoT device 116 in FIG. 1. The computing functions of device 202 may be provided by processing circuitry (e.g., one or more of central processing units (CPUs), graphics processing units (GPUs), microprocessors, general-purpose processors, host processors, microcontrollers, digital signal processors, programmable logic devices, and other types of processor circuitry) and memory circuitry (e.g., one or more of non-volatile memory, volatile memory, hard disk drive storage, solid-state storage, and other types of storage circuitry) on device 202. In particular, the memory circuitry may include non-transitory (tangible) computer readable storage media that stores the operating system software and/or any other software code, which when executed by the processing circuitry, performs desired operations of client device 202 such as providing a user input-output interface (e.g., running a web browser application on which a graphical user interface is provided).

In one illustrative arrangement, client device 202 may include input-output devices 204 such as a display, a keyboard, and a mouse, as just a few examples of user interfaces. The display may present a user with an output (e.g., to display a web browser application with a graphical user interface), and the user/admin may interact with such interface using the keyboard and mouse (e.g., the user/admin can supply an input to the web browser application via the graphical user interface). In accordance with some embodiments, a user/admin can supply, via the user interface provided by input-output device 204, a natural language query inquiring some information relating to network 120. For example, the user/admin can input a natural language query requesting information about one or more entities within the network, can input a natural language query for troubleshooting one or more aspects of the network, can input a natural language query for analyzing one or more portions of the network, can input a natural language query for simulating a network policy such as a network access policy, and/or can input a natural language query relating to other properties of the network. The natural language query received at input-output device 204 of client device 202 can then be conveyed to network access control and management server 100 via one or more communication paths, as indicated by arrow 1106.

A "network access policy" (sometimes referred to as network access control policy) can refer to and be defined herein as a set of rules and guidelines that dictate how client devices can connect to and interact with one another in a computer network. Network access policies lay out the permissions, restrictions, and protocols governing network access and usage to ensure security, integrity, and availability of computing resources. For example, network access policies can include policies relating to how devices must authenticate their identities to gain access to the network, access control lists or ACLs (e.g., lists of rules indicating which files, folders, or resources are accessible to specific users or groups), network segmentation to ensure isolation from different network segments to help increase the overall security, encryption requirements, firewall rules, remote access requirements, policies that govern the types of devices allowed to connect to a certain part of the network, guidelines for keeping the devices up to date with the latest security patches or updates, policies for monitoring network activities and events for potential breaches, and/or other rules and policies.

Server 100 may receive the natural language query and process the natural language query using natural language model 1100 and/or network-related language model 1102. For example, server 100 may leverage natural language model 1100 to determine or classify the intent of the natural language query. Server 100 may leverage network-related language model 1102 to identify one or more named entities within the natural language query. After determining the intent and identifying the one or more name entities of the natural language query, server 100 can obtain information from the network records in an attempt to respond to the natural language query. As shown in FIG. 2, server 100 can generate a tenant-specific network-related response that is conveyed back to client device 202 via one or more communications paths, as indicated by arrow 1108. This network-related response can be presented to the user/admin using input-output device 204 (e.g., by outputting the tenant-specific network-related response on a display of client device 202).

The network records relating to different customers or tenants can be maintained on a database such as multi-tenant database 1104. In the example of FIG. 2, multi-tenant database 1104 is considered part of network access control and management server 100. This is illustrative. In other embodiments, multi-tenant database 1104 can be implemented separately from server 100 on public cloud network 200 or a private cloud network. Configurations in which multi-tenant database 1104 is implemented as part of server 100 are sometimes described as an example herein.

Figure 3:
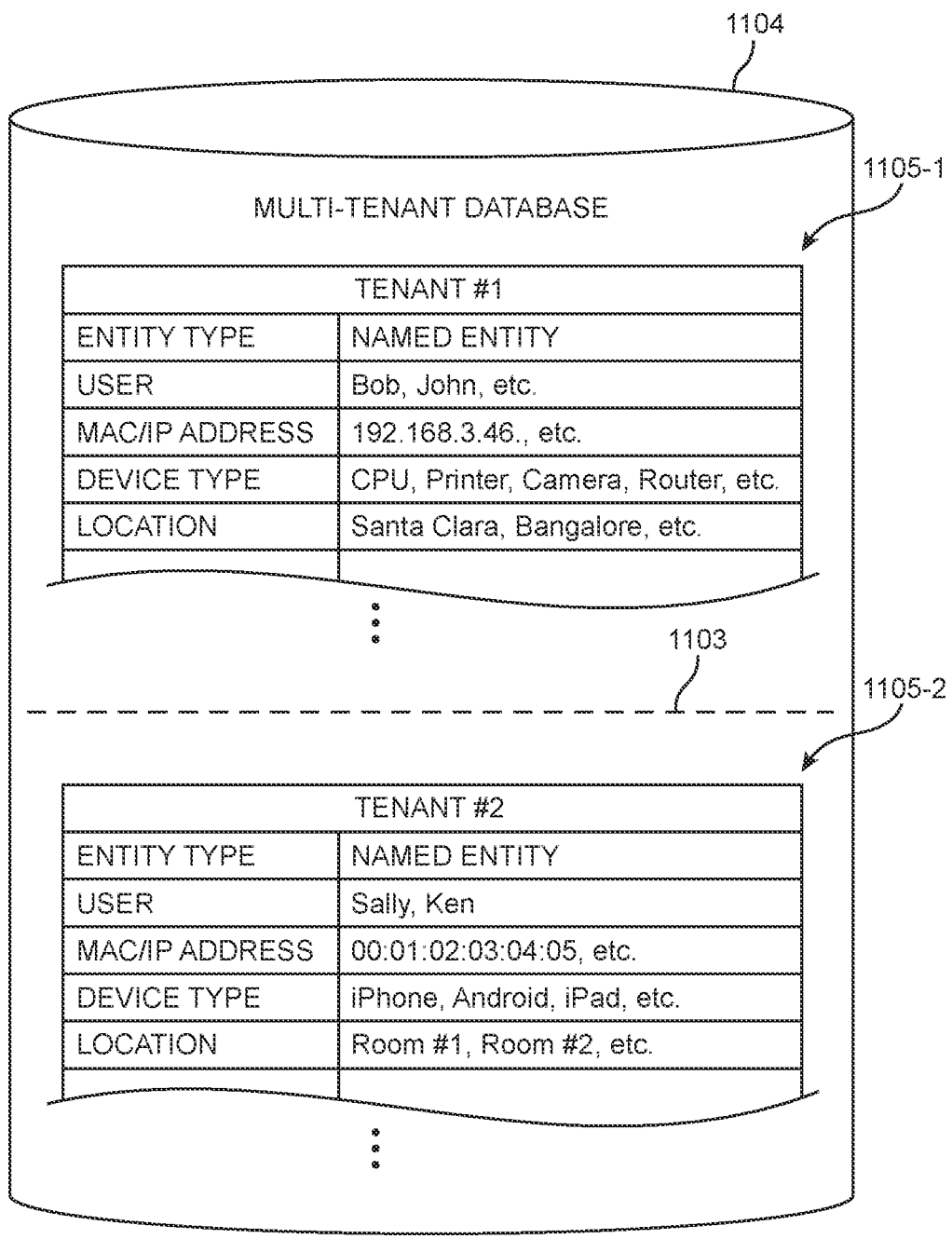
FIG. 3 is a diagram of an illustrative multi-tenant database that includes a list of named entities for different isolated tenants in accordance with some embodiments.

FIG. 3 is a diagram of an illustrative multi-tenant database 1104 that includes a list of named entities for different tenants (e.g., for different customers). As shown in FIG. 3, multi-tenant database 1104 may include a first list of named entities 1105-1 associated with a first tenant, a second list of named entities 1105-2 associated with a second tenant, and so on. A list of named entities 1105 associated with a particular tenant can sometimes be referred to as tenant-specific named entity list. The example of FIG. 3 in which multi-tenant database 1104 includes at least two tenant-specific named entity lists is merely illustrative. In general, multi-tenant database 1104 can include one or more tenant-specific named entity lists, only one tenant-specific named entity list, two or more tenant-specific named entity lists, three to ten tenant-specific named entity lists, more than 10 tenant-specific named entity lists, 10-100 tenant-specific named entity lists, or more than 100 tenant-specific named entity lists.

In the example of FIG. 3, first named entity list 1105-1 can include a list of named entities corresponding to different entity types associated with the first tenant (tenant 190 1). Different entity types can include: user, media access control (MAC) or internet protocol (IP) address, device type, location, network domains, applications, services, virtual machines, virtual networks, security related elements (firewall policies, access control lists, security groups, etc.), network segments, and/or other network-related entity types. For the first tenant, list 1105-1 might include "Bob" and "John" as separate named entities under user entity type, "192.168.3.46" as a named entity under the MAC/IP address entity type, "CPU, Printer, Camera, Router" as named entities under the device type entity type, and "Santa Clara, Bangalore" as named entities under the location entity type. The list of named entities for the first tenant is merely illustrative.

The second named entity list 1105-2 can include a list of named entities corresponding to different entity types associated with the second tenant (tenant 190 2). Different entity types can include: user, media access control (MAC) or internet protocol (IP) address, device type, location, network domains, applications, services, virtual machines, virtual networks, security related elements (firewall policies, access control lists, security groups, etc.), network segments, and/or other network-related entity types. For the second tenant, list 1105-2 might include "Sally" and "Ken" as separate named entities under user entity type, "00:01:02:03:04:05" as a named entity under the MAC/IP address entity type, "iPhone, Android, iPad" as named entities under the device type entity type, and "Conference Room #1, Conference Room #2" as named entities under the location entity type. The list of named entities for the second tenant is merely illustrative.

In some embodiments, the data associated with different tenants can be isolated from one another. This is illustrated conceptually in FIG. 3 by isolation boundary 1103. After the intent/purpose classification and named entity extraction operations, server 100 can perform searching, troubleshooting, analysis, monitoring, configuration, management, recovery, access control, capacity planning, and/or network-related processes by accessing only one of the named entity lists 1105, without accessing the other isolated named entity lists. Limiting the access of multi-tenant database 1105 in this way is technically advantageous and beneficial to ensure that the corresponding network-related response generated by server 100 is specific, relevant, or confined to a particular tenant/customer.

Figure 4:
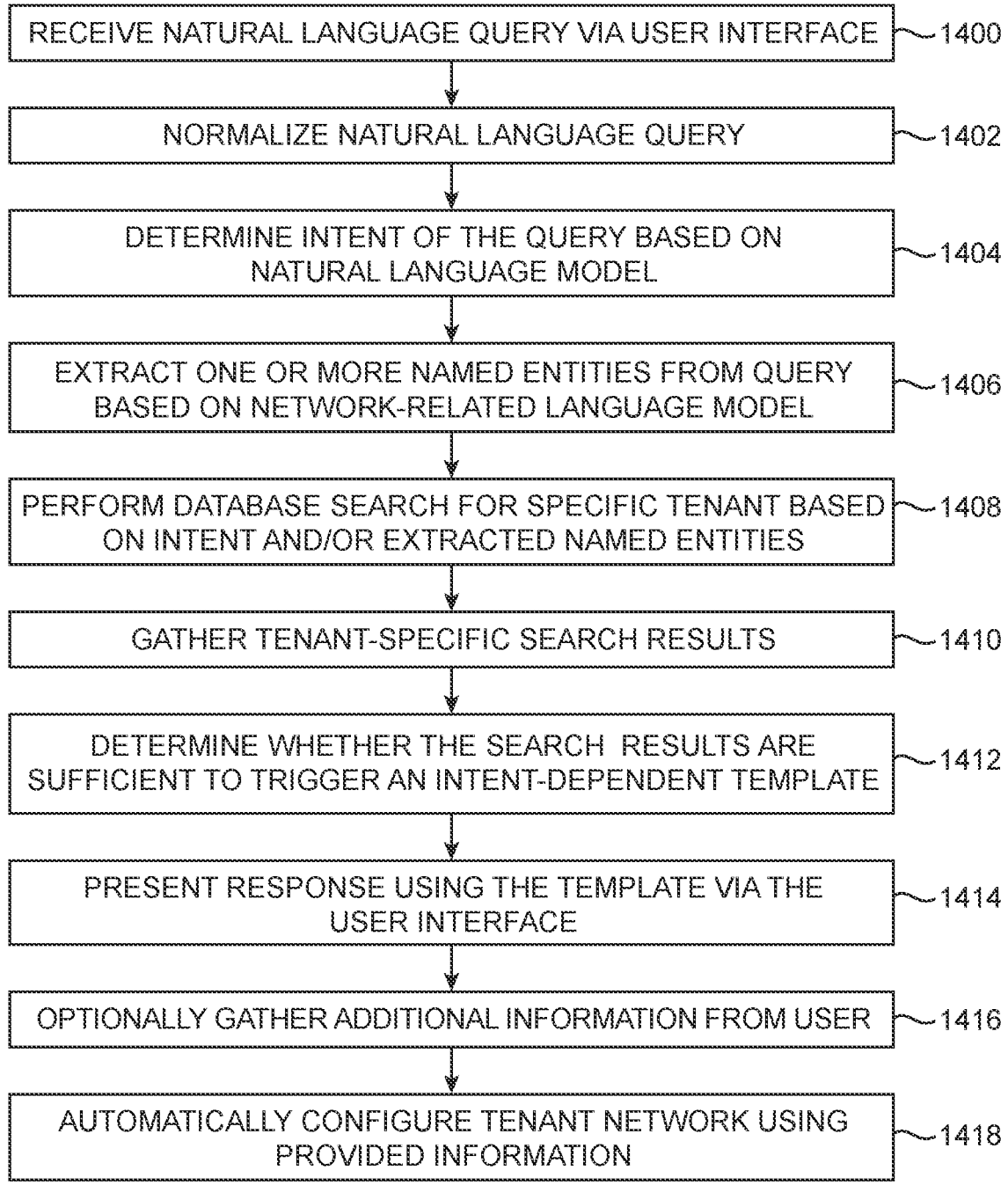
FIG. 4 is a flow chart of illustrative steps for operating a network access control management server of the type shown in FIG. 2 in accordance with some embodiments.

FIG. 4 is a flow chart of illustrative steps for operating network access control management server 100 of the type described in connection with FIGS. 1-3. During the operations of block 1400, server 100 may receive a natural language query via a user interface on client device 202 (see, e.g., arrow 1106 in FIG. 2). The examples described herein where the natural language query is received via a keyboard, mouse, or touchscreen via physical or tactile input are merely illustrative. If desired, the natural language query can be provided via voice input, gesture input, gaze input, motion input, a stylus or pen, brain-computer interface input (e.g., using brain signals to provide direction to server 100), and/or other types of user input can be employed.

During the operations of block 1402, server 100 may normalize the received natural language query. For example, the natural language query can be modified to correct anomalies (e.g., to capitalize certain letters that should be capitalized, or to make certain capitalized letters lower case), to correct grammar mistakes, to correct spelling mistakes, and/or to otherwise clean up or scrub the text or content of the natural language query so that the resulting query will not be skewed by any unintended anomalies. A natural language query output from block 1402 can be referred to as a normalized natural language query. The normalization operations of block 1402 are optional.

During the operations of block 1404, server 100 may determine an intent or purpose of the normalized language query. Server 100 can determine the intent/purpose based on the natural language model 1100. As an example, server 100 might determine that the intent/purpose of the user query is to inquire about information about one or more devices within the network. As another example, server 100 might determine that the intent or purpose of the user query is to troubleshoot a certain aspect of the network. As another example, server 100 might determine that the intent or purpose of the user query is to analyze or monitor a certain portion of the network. As another example, server 100 might determine that the intent or purpose of the user query is to configure or otherwise manage one or more devices within the network. These examples are illustrative. Other user intents or purposes can be identified using natural language model 1100.

During the operations of block 1406, server 100 may extract one or more named entities from the natural language query. Server 100 can glean the named entity information based on the network-related language model 1102. As an example, server 100 might identify and extract a noun "Bob" from the user query as a potential network-related named entity. As another example, server 100 might identify and extract a noun "printer" from the user query as a potential network-related named entity. As another example, server 100 might identify and extract a noun "New York City" from the user query as a potential network-related named entity. As another example, server 100 might identify and extract a term "00:1b:63:84:e6" as a potential network-related named entity. These examples are illustrative. Other network-related named entities can be extracted from the normalized natural language query. The flow of FIG. 4 in which the operations of block 1406 are performed after the operations of block 1404 is exemplary. If desired, the operations of block 1406 can be performed before or in parallel (simultaneously) with the operations of block 1404.

During the operations of block 1408, server 100 may perform a database search for a specific tenant based on the intent or purpose obtained from block 1404 and/or based on the named entity (or entities) extracted from block 1406. For instance, consider a scenario in which the user query is for the first tenant #1 in the example of FIG. 3. If server 100 extracts a named entity "Bob" during block 1406 and determines that the intent/purpose of the user query is to gather information about "Bob" during block 1404, then server 100 can determine that there is a corresponding match within named entity list 1105-1 and can proceed with gathering additional information relating to "Bob." Alternatively, if server 100 extracts a named entity "Sean" during block 1406 and determines that the intent or purpose of the user query is to gather information about "Sean" during block 1404, then server 100 might determine that there is not a corresponding match within named entity list 1105-1 (e.g., the user/admin is requesting information about a non-existent user) and will therefore stop gathering any information about "Sean."

If the extracted named entity (or entities) results in one or more matches (or "hits") within the corresponding tenant-specific named entity list on multi-tenant database 1104, then processing can proceed to block 1410. During the operations of block 1410, server 100 can gather tenant-specific search results. In an example where server 100 is tasked to obtain information about a given user or device, server 100 can gather the requested information about the given user or device. In an example where server 100 is tasked to troubleshoot a particular issue in the network, server 100 can gather relevant information that might be helpful in diagnosing the issue or problem at hand. In an example where server 100 is tasked to analyze a particular segment of the network, server 100 can gather relevant performance metrics or other monitoring data associated with the operations of the network segment of interest. In an example where server 100 is tasked to simulate a particular network policy, server 100 can simulate or otherwise estimate the behavior or traffic of the relevant network elements under the network policy of interest. In general, any type of information about a particular tenant can be gathered during block 1410. As described in connection with FIG. 3, this searching can be confined to a particular tenant, by providing isolation or guardrails to ensure that data for one customer is not inadvertently leaked to another customer. This feature may be particularly beneficial in financial, healthcare, and government related applications.

The search results obtained from block 1410 can be referred to as "raw" data. If desired, this raw data can be output directly to the user/admin without any further organization. In accordance with some embodiments, to help ensure that the search results are actually relevant and in an effort to present the information in an easy to digest manner, server 100 can determine whether the raw search results are sufficient to trigger an intent-dependent template during the operations of block 1412. An intent-dependent template sets a minimum threshold that needs to be met before returning an organized or relevant response to the user. An intent-dependent template is therefore sometimes referred to as an intent-based output template and can refer to and be defined herein as an output template with one or more fields or criteria that need to be filled or satisfied depending on the intent or purpose of the query. An intent-dependent template can also be referred to as a purpose-dependent or purpose-based output template. For example, an intent-dependent template might require two pieces of information to be gathered before the template can be triggered for output. This is merely illustrative. In general, an output template might require different amounts of data depending on the intent of the natural language query. For examples of various intent-dependent output templates, refer to the description of FIGS. 5-12 below.

If an intent-dependent output template is triggered, then server 100 can convey the tenant-specific network-related response to client device 202, and client device 202 can present the response using the triggered output template via the user interface (e.g., by presenting the organized response using a display), as shown by the operations of block 1414. As described above, the operations of blocks 1412 and 1414 are optional and can be omitted in a scenario where server 100 simply returns the raw data to the user/admin without any processing.

In certain scenarios, server 100 might optionally gather additional network-related information from the user/admin (see operations of block 1416). In an example where the user/admin is asking server 100 to troubleshoot and set up a functional network, server 100 might query the user for additional network setup information to help properly configure the network. In response to receiving the additional information from the user/admin, server 100 can automatically configure or set up a tenant network using the provided information (see operations of block 1418). Configuring or managing a network in this way can be technically beneficial and advantageous by removing or reducing the opportunity for human/operator error.

The operations of FIG. 4 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 5:
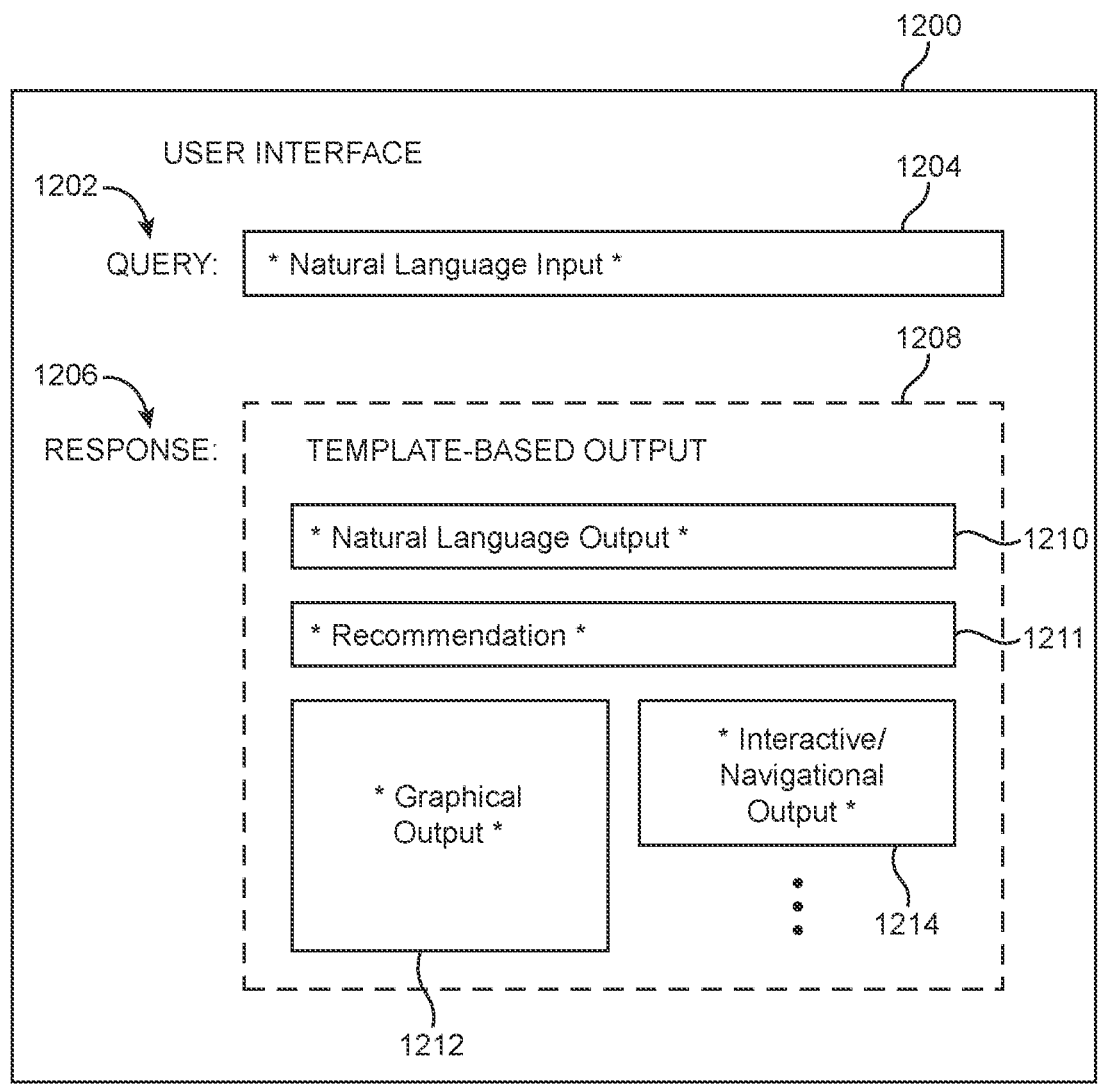
FIG. 5 is a diagram of an illustrative user interface having an input field for receiving a natural language query and an output field for presenting a template-based response in accordance with some embodiments.

FIG. 5 is a diagram of an illustrative user interface 1200 for network access control and management server 100 to receive input from a user and for server 100 to present an output to the user. In particular, user interface 1200 may be provided at a client device such as client device 202 communicatively coupled to server 100 (see, e.g., FIG. 2). In the example of FIG. 5, user interface 1200 may be a graphical user interface that is displayed to a user/admin as part of a web browser application, a desktop application, a mobile application, and/or other software application. The terms "user" and "admin" can sometimes be used interchangeably herein.

As shown in FIG. 5, user interface 1200 may output (display) a prompt 1202 for querying an input from a user and may provide a region 1204 (e.g., a text box) for displaying the received user input. The user input can be a natural language input and is sometimes referred to herein as a natural language query. The natural language query input by the user can be displayed within region 1204. User interface 1200 may also output (display) a response region identifier 1206 indicating a region 1208 for displaying the tenant-specific network-related response. The tenant-specific network-related response can be referred to as a query response. The content displayed within response region 1208 can be organized in accordance with an intent-dependent template. Thus, the content presented within region 1208 can be referred to as a template-based output. As a result, the template-based output can vary depending on the input query.

As just a few examples, the query response may include any combination of a natural language output displayed in region 1210 (e.g., a text box providing an answer to the initial natural language query in plain English), a recommendation displayed in region 1211 (e.g., a text box providing one or more suggestions to the user, potentially associated with response in region 1210), a graphical output displayed in region 1212 (e.g., one or more bar charts, one or more line charts, one or more pie charts, one or more scatter plots, one or more histograms, one or more tables, one or more heat maps, one or more flow charts, one or more network diagrams, one or more box plots, etc.), an interactive and/or navigational output displayed in region 1214 (e.g., user interface elements such as one or more hyperlinks to additional content or records), and/or other types of output that might be helpful or relevant to the initial user query.

Various examples of user input queries and corresponding responses that can be generated by network access control and management server 100 are shown in FIGS. 6-12. FIG. 6 is a diagram of an illustrative query about a user and a corresponding response that can be generated by server 100. As shown in FIG. 6, a user may input a natural language query with the text "Get info about Edwards." In response to receiving this query, server 100 can perform one or more of the operations described above in connection with FIG. 4 and output a corresponding response. In this example, server 100 may determine, based on natural language model 1100 (see FIG. 2), that the intent of this query is to gather information about a user and may extract, based on the network-related language model, "Edwards" as a potential named entity or user.

The response shown in FIG. 6 may be based on an output template that corresponds to the identified intent for gathering information about a certain user. Here, server 100 may find Edwards within a particular list on multi-tenant database 1104 and obtain information (network records) about Edwards such as Edwards' email address, the number of devices registered under his/her name and their respective MAC address, whether Edwards' device(s) is currently connected to the network, and whether Edwards has recently signed onto the network. As shown in FIG. 6, the query response can be presented as a natural language output showing how Edwards' email address is edwards@domain.com, how Edwards has a iPhone with MAC address 00:01:02:03:04:05 and a Windows device with MAC address 00:23:34:46:57:78, how Edwards' iPhone is currently connected to the network, and how Edwards appears to be offline for the past few days.

FIG. 7 is a diagram of an illustrative query about a user and a corresponding response that can be generated by server 100. As shown in FIG. 7, a user may input a natural language query with the text "Tell me about user bob." In response to receiving this query, server 100 can perform one or more of the operations described above in connection with FIG. 4 and output a corresponding response. In this example, server 100 may determine, based on natural language model 1100, that the intent of this query is to gather information about a user and may extract, based on the network-related language model, "bob" as a potential named entity or user. Server 100 may perform a query normalization step to capitalize "Bob."

The response shown in FIG. 7 may be based on an output template that corresponds to the identified intent for gathering information about a certain user. Here, server 100 may find Bob within a particular list on multi-tenant database 1104 and obtain information (network records) about Bob such as Bob's email address, the number of devices registered under his name, when Bob was last active on the network, and whether Bob currently has any device connected to the network. As shown in FIG. 7, the query response can be presented as a natural language output showing how Bob's email address is bob@arista.com, how Bob has two onboarded devices, how Bob was last active on the network two days ago, and how none of Bob's devices are currently connected to the network. Moreover, the response of FIG. 7 can also include an interactive hyperlink such as link 1450. A click or selection of link 1450 can direct the user/admin to additional details of the N most recent network access records, where N can be any positive integer. The network access records relating to different customers or tenants can be maintained on a database such as multi-tenant database 1104 (see, e.g., FIG. 2), can be stored on other equipment in a public cloud network 108 (see, e.g., FIG. 1) or a private cloud network, can be stored on supplemental server or equipment 124, and/or can be sorted on equipment in client network 120.

FIG. 8 is a diagram of an illustrative troubleshooting query and a corresponding response that can be generated by server 100. As shown in FIG. 8, a user may input a natural language query with the text "Why devices are not able to connect." In response to receiving this query, server 100 can perform one or more of the operations described above in connection with FIG. 4 and output a corresponding response. In this example, server 100 may determine, based on natural language model 1100, that the intent of this query is to troubleshoot the network. The response shown in FIG. 8 may be based on an output template that corresponds to the identified intent for troubleshooting the network. Here, server 100 may examine the network records and obtain information about the number of failed sessions and possible reasons for the failures along with a recommendation to the user/admin for correcting the failure.

As shown in FIG. 8, the query response can be presented as a natural language output showing how there has been more than 10 failed sessions, how there's an 80% likelihood that a pre-shared key (PSK) used to connect to the network does not match the configured PSK along with a recommendation to use the correct PSK and to check if this is an illegal access, and how there's a 20% likelihood that network access is being denied by the configured network access policy along with a recommendation to check the network access policy configurations, to ensure that the client is not violating such policy, etc. Moreover, the response of FIG. 8 can also include an interactive hyperlink such as link 1462. A click or selection of link 1462 can direct the user/admin to additional authentication records indicating detailed reasons for failure.

Figure 9:
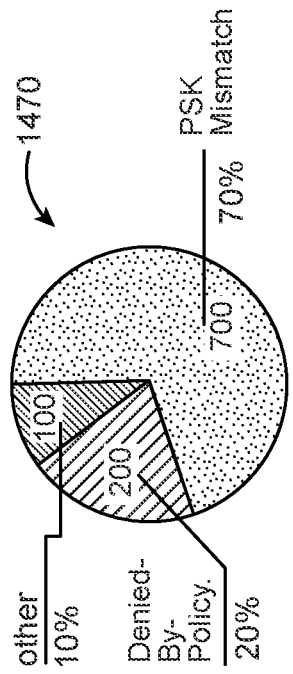
FIG. 9 is a diagram of an illustrative query for troubleshooting a particular type of device in a network and a corresponding response with a graphical output that can be generated by the network access control and management server in accordance with some embodiments.

FIG. 9 is a diagram of an illustrative troubleshooting query and a corresponding response that can be generated by server 100. As shown in FIG. 9, a user may input a natural language query with the text "Why Printers are not able to connect?" In response to receiving this query, server 100 can perform one or more of the operations described above in connection with FIG. 4 and output a corresponding response. In this example, server 100 may determine, based on natural language model 1100, that the intent of this query is to troubleshoot the network, and may extract, based on network-related language model 1102, "Printer" as a named entity. The response shown in FIG. 9 may be based on an output template that corresponds to the identified intent for troubleshooting the network. Here, server 100 may examine the network records and obtain information about possible reasons for failure along with a recommendation to the user/admin for correcting the failure.

As shown in FIG. 9, the query response can be presented as a natural language output showing how the most likely reason that the printers are failing to connect is due to PSK mismatch, which is denying the printers' access to the network. The response can optionally include one or more recommendations for fixing this issue such as informing the user/admin to use a correct PSK. Moreover, the response of FIG. 9 can also include a pie chart such as pie chart 1470 showing how there is a 70% probability that the failure is due to PSK mismatch, how there is a 20% probability that the failure is due to network access policy configuration, and how there is a 10% probability that the failure is due to other reasons. The response of FIG. 9 can also include a table such as table 1472 listing the N latest printer connection details and an interactive link 1474 that, upon a click or selection, can direct the user/admin to additional session records and other information that might help reveal the reason(s) for failure.

FIG. 10 is a diagram of an illustrative query that results in an ambiguous response that can be generated by server 100. As shown in FIG. 10, a user/admin may input a natural language query with the text "Why edward is not able to authenticate?" In response to receiving this query, server 100 can perform one or more of the operations described above in connection with FIG. 4 and output a corresponding response. In this example, server 100 may determine, based on natural language model 1100, that the intent of this query is to gather information about a user and may extract, based on the network-related language model, "edward" as a potential named entity or user. Server 100 may perform a query normalization step to capitalize "Edward."

The response shown in FIG. 10 may be based on an output template that is used when server 100 is unable to ascertain which "Edward" the user/admin is inquiring about. Here, server 100 may find multiple Edwards in a corresponding list 1105 on multi-tenant database 1104. As shown in FIG. 10, the query response can be presented as a natural language output indicating there are multiple Edwards in the user's organization and can list the email addresses of the various Edwards that were found within the organization. The user can select from among the various candidates (e.g., by clicking on edwardA@domain.com, edwardB@domain.com, or edwardC@domain.com). Once the user clicks on one of these options, server 100 can proceed normally to gather and present whatever network access record it can find about the selected user. If desired, a user click on one of these email addresses can optionally open or generate an email template to send to the selected candidate.

FIG. 11 is a diagram of an illustrative query that results in a default response that can be generated by server 100. As shown in FIG. 11, a user/admin may input a natural language query with the text "Will bob come to office today?" In response to receiving this query, server 100 can perform one or more of the operations described above in connection with FIG. 4 and output a corresponding response. In this example, server 100 may determine, based on natural language model 1100, that the intent of this query is to gather information about a user and may extract, based on the network-related language model, "bob" as a potential named entity or user. Server 100 may perform a query normalization step to capitalize "Bob" and may optionally correct any grammar mistakes in the query (e.g., by changing the query to "Will Bob come into the office today?"). The response shown in FIG. 11 may be based on a (default) output template that is used when server 100 is unable to find Bob within the organization (e.g., there is a "miss" in the corresponding named entity list within multi-tenant database 1104). As shown in FIG. 11, the query response can be presented as a natural language output with the default message/text: "I'm sorry, I could not find the required information matching the given query."

FIG. 12 is a diagram of an illustrative query for setting up a network and a corresponding response requesting additional network-related information that can be generated by server 100. As shown in FIG. 12, a user/admin may input a natural language query with the text "I want to set up wireless network." In response to receiving this query, server 100 can perform one or more of the operations described above in connection with FIG. 4 and output a corresponding response. In this example, server 100 may determine, based on natural language model 1100, that the intent or purpose of this query is to set up or configure a new network. Server 100 may optionally correct any grammar mistakes in the query (e.g., by changing the query to "I want to set up a wireless network").

The response shown in FIG. 12 may be based on an output template that prompts additional information from the user. Server 100 can identify the information that it needs to complete the requested task at hand, and then output a query response asking the user for any missing information. In this example, the query response might ask the user, "What SSID do you want to use?" The user is then given an opportunity to provide the missing piece of information. Here, the user may input "Skynet007" as the SSID that he/she wishes to use for the new wireless network. Upon receiving this additional user input, server 100 can proceed to automatically set up and configure the wireless network without requiring the user to manually configure any network settings, assuming no other information is needed. If additional information is needed, server 100 can continue to prompt the user for more input. Setting up or configuring a network automatically using server 100 in this way can be technically advantageous and beneficial by reducing the chance of human/operator error.

The foregoing is merely illustrative and various modifications can be made to the described embodiments. The foregoing embodiments may be implemented individually or in any combination.

What is claimed is:

1. A method of operating a network associated with a tenant, the method comprising:
   receiving a network-related query;
   determining, based on a first language model, an intent of the network-related query;
   communicating with one or more network devices in the network to obtain network records associated with the one or more network devices for training a second language model, different than the first language model, based on the network records;
   extracting, based on the second language model, a named entity from the network-related query by extracting one or more of: a user, a media access control (MAC) address, an Internet Protocol (IP) address, a device type, a location, a network domain, a network service, and a network segment;
   storing, on a multi-tenant database, a plurality of named entity lists associated with a plurality of tenants; and
   obtaining tenant-specific network-related search results by searching for the extracted named entity on a named entity list corresponding to the tenant in the plurality of named entity lists stored on the multi-tenant database.

2. The method of claim 1, further comprising:
   generating a response based on the tenant-specific network-related search results.

3. The method of claim 2, wherein receiving the network-related query comprises receiving a natural language query, and wherein generating the response comprises generating a natural language response.

4. The method of claim 2, wherein the first language model comprises a natural language model, and wherein the second language model comprises a network-related language model that is trained on the network records.

5. The method of claim 2, further comprising:
   determining whether the tenant-specific network-related search results are sufficient to trigger an output template; and
   in response to determining that the tenant-specific network-related search results are sufficient to trigger the output template, presenting the response in accordance with the output template.

6. The method of claim 2, wherein generating the response comprises prompting for additional input, the method further comprising:
   in response to receiving the additional input, automatically configuring the network for the tenant based on the additional input.

7. The method of claim 2, wherein receiving the network-related query comprises receiving a query requesting information on a user, the method further comprising:
   in response to finding the extracted named entity in the named entity list, displaying the response that includes information on the user, wherein the information on the user includes one or more of: an email address of the user, a number of devices associated with the user, a media access control (MAC) address of each device associated with the user, and whether one or more of the devices associated with the user is currently connected to the network.

8. The method of claim 7, wherein the response further includes a link to additional network access records associated with the user.

9. The method of claim 2, wherein receiving the network-related query comprises receiving a query to troubleshoot the network, the method further comprising:
   displaying the response that includes information about the network, wherein the information about the network includes one or more of: a number of failed sessions, one or more reasons for network failure, and a probability associated with each of the reasons for network failure.

10. The method of claim 9, wherein the response further includes a link to additional authentication records for the network or a graphical chart illustrating the reasons for network failure and their respective probabilities.

11. The method of claim 2, wherein receiving the network-related query comprises receiving a query requesting information on a user, the method further comprising:
displaying the response listing multiple candidates potentially associated with the user.

12. The method of claim 2, wherein receiving the network-related query comprises receiving a query requesting information on a user, the method further comprising:
in response to not finding the extracted named entity in the named entity list, displaying the response with a default message.

13. A method of operating a network comprising:
receiving a query for simulating a network access policy for the network;
determining that an intent of the query is to simulate the network access policy for the network;
simulating the network access policy for the network to obtain simulation results for the query;
determining whether the simulation results trigger an intent-dependent output template; and
in response to determining that the simulation results trigger an intent-dependent output template, presenting a response in accordance with the triggered intent-dependent output template.

14. The method of claim 13, further comprising:
receiving a query for troubleshooting the network;
determining that an intent of the query is to troubleshoot the network; and
in response to determining that the intent of the query is to troubleshoot the network, troubleshooting the network by extracting, from the query, one or more of: a username, a media access control (MAC) address, an Internet Protocol (IP) address, a device type, a location, a network domain, a network service, and a network segment.

15. A method of operating a network comprising:
receiving a natural language query;
normalizing the natural language query to remove anomalies from the natural language query;
determining a purpose of the natural language query;
presenting a response requesting for missing network configuration information based on the purpose of the natural language query; and
in response to receiving the missing network configuration information, automatically setting up or configuring the network using the missing network configuration information.

16. The method of claim 15, wherein determining a purpose of the natural language query comprises determining a purpose of the natural language query based on a natural language model, the method further comprising:
extracting a named entity from the natural language query; and
searching for the extracted named entity on one or more named entity lists that are stored on a multi-tenant database.

\* \* \* \* \*